2,975,624

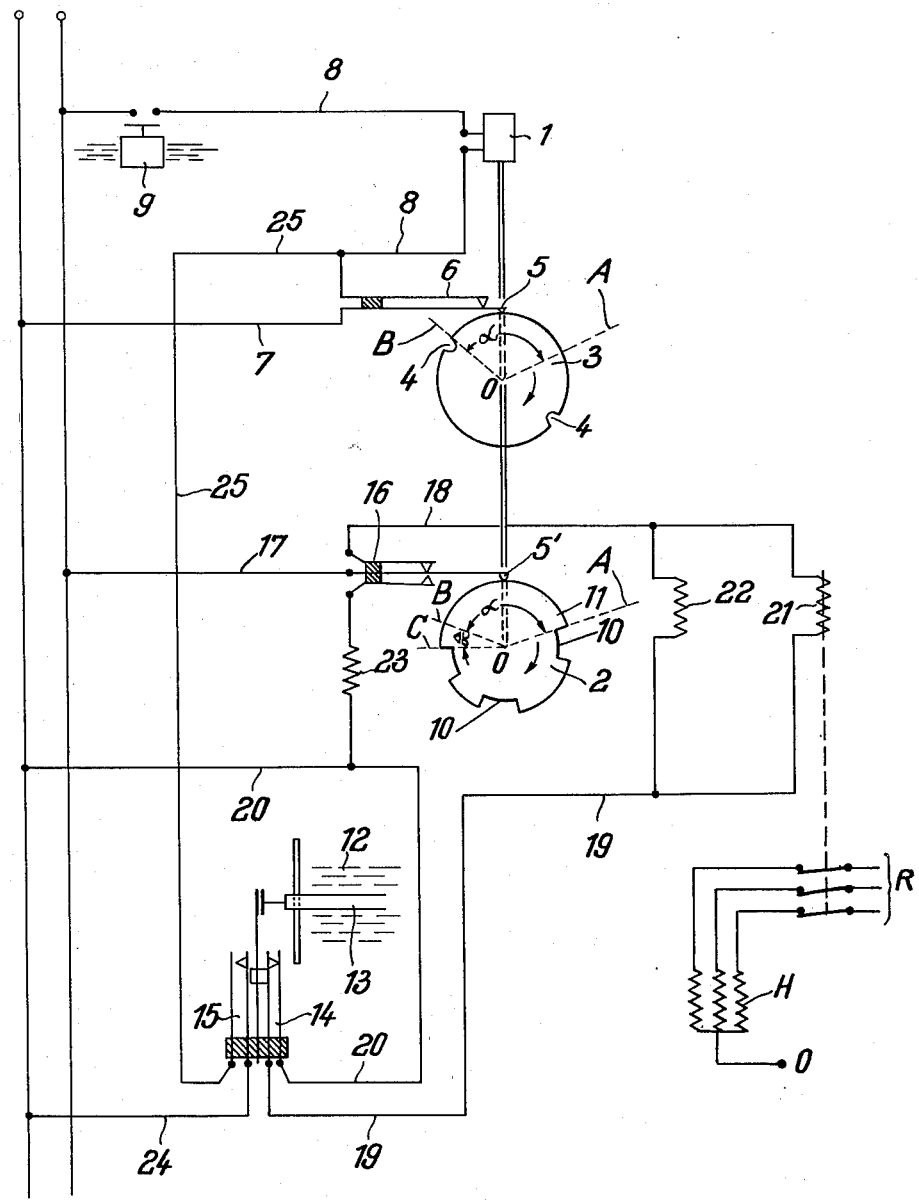

WASHING MACHINES

Hugo Werner Geschka, Dusseldorf, Germany, assignor to Maschinenfabrik Peter Pfenningsberg G.m.b.H., Dusseldorf-Oberkassel, Germany Filed Sept. 4, 1957, Ser. No. 681,978

Claims priority, application Germany Sept. 8, 1956

1 Claim. (Cl. 68—12)

In automatic washing machines it is known to heat the cold water to the temperature desired for washing, e.g. 45, 70 or 95° C., by means of heating resistances in the machine. These heating resistances are switched on by a pre-set control device which controls the cycle of operations of the washing machine, and are kept in operation for a definite time determined by the pre-set control device, this time being dependent on the amount of heating required by the water. Although this method is in general satisfactory for obtaining the desired temperature of the water, it possesses disadvantages. Thus, it may happen that when the washing machine has been in use for some time one of the heating resistances will become damaged and will go out of action. The time during which the other heating coils are in operation will then be insufficient to heat the water to the prescribed temperature. A similar occurrence may take place when, as happens frequently in country districts, the supply voltage available is less than the rated value, e.g. 220 volts. In this case also, the water cannot be heated adequately within the time set by the pre-set control device.

The object of the invention is to provide an apparatus which will assure correct water temperature in washing machines wherein the water is heated to the prescribed temperature by heating coils which remain switched on for a length of time and are controlled by a pre-set control device. This object is achieved, in accordance with the invention, by interrupting the washing cycle if the water is not heated to the prescribed temperature within the time set by the pre-set control device, and only continuing with the washing cycle when the necessary temperature has been reached. For carrying out this process, a suitable apparatus comprises a motor which rotates a time-control disc of the above-mentioned control device and also rotates a second disc which runs synchronously with the first. Shortly before the first rotating disc of the control device has reached a position where it is due to switch off the heating coils, the second rotating disc opens a switch in the circuit of the motor which is connected in parallel with another circuit which also leads to the motor and which contains a thermostatically controlled switch. With this arrangement, provided that not all heating coils are out of operation, the required washing temperature is always reached. Thus, for example, if one of three heating coils is out of action, the progress of the washing cycle is interrupted and it is kept at the heating stage until the remaining heating coils have raised the washing liquid to the required pre-set temperature. The duration of the washing process is prolonged correspondingly. A further advantage of the invention is that, when the heating time of the heating coils is pre-set by means of the pre-setting device, it is no longer necessary to set this according to the longest time which might be required, i.e. the time which would be required for a large quantity of very cold water to be supplied to the machine. On the contrary, it is now possible to set the machine to the desired temperature regardless of the quantity of water or original temperature of the water. Consequently, a considerable saving in heating time, is effected since the rotating discs of the pre-setting device controlling the heating coils can now be set for the most favorable, i.e. the shortest time necessary for heating to a certain temperature in each case.

The invention will now be described, by way of example, with reference to the accompanying circuit diagram;

The motor 1 of the cycle control device drives, among others, two discs 2 and 3, of which the disc 2 controls the washing and heating and the other disc 3 controls the duration of the entire cycle. The disc 3 is provided with recesses 4 about its circumference. When the arm 5 of a switch contact 6 drops into one of these recesses, the contact 6 is broken, so that the motor 1 comes to rest. In the circuit 7, 8 leading to the motor, there is provided a switch 9 operated by a float to ensure that the washing process will not be started until the water has reached a certain minimum level. The disc 2 has recesses 10 in its circumference, the length of each recess corresponding to the duration of a centrifuging operation. The elevations 11 lying between the recesses of the disc 2, on the other hand, correspond to the washing cycle.

In the present example, the water is heated only during the washing process, so that the elevations 11 of the disc 2 also correspond to the heating periods. In the container of the washing drum 12, there is provided a thermostat 13 which, when a certain temperature is reached, e.g. 90°, opens a contact 14 and closes another contact 15. If the arm 5' of another contact 16 is in its upper position, as shown in the drawing, while the contact 14 is closed, it then closes the circuit 17, 18, 19 and 20 passing through the relay 21 for operating the heating coils, and through the relay 22 for switching the main motor into the reversed washing cycle.

If, on the other hand, the arm 5' is in a recess 10 of the disc 2 while the contact 14 is closed, then the relays for the heating coils and for the reverse washing cycle through the main motor are de-energised, whereas the circuit 17, 20 of the relay 23 for switching the main motor to "centrifuging" of the washing drum, is closed.

There is a definite relationship between the recesses 4 and 10 of the rotating discs 3 and 2 respectively. Assuming that the cycle begins with the discs in the positions indicated by the dotted lines A, when the disc 3 has rotated through an angle $\alpha$ the arm 5 drops into the recess at the position B, the motor being thereby switched off. At the same time, the arm 5' has not yet dropped into the recess 10 at the position C, because the angle AOC is greater than the angle AOB, i.e. it is equal to $\alpha + \Delta\alpha$. If the washing temperature has then not yet been reached, so that the contact 14 is still closed, then the heating relay 21 is held in the circuit so that the water continues to be heated.

When the desired temperature is reached, the contact 15 closes, and the current passes through the lead 25 to the the motor, the contact 6 being bridged over so that the motor 1 is set into operation again. When the disc 2 has turned further through the small distance $\Delta\alpha$ the arm 5' drops into the recess at the position C, so that the relay 23 is energised and the centrifuging cycle is set into operation. Should the desired temperature have already been reached before the disc 3 has rotated to B, the cycle would continue without interruption.

The temperature switch 13, 14, 15 is preferably provided with several contact steps, one for each of the different temperatures, the temperature being selected either by means of a separate switch, e.g. on a keyboard, or switched in a definite part of the cycle by the pre-setting device.

I claim:

A device for maintaining the water temperature in an automatic washing machine, comprising, in combination electrical heating resistances, a time control motor, a cycle switch control disc having peripheral spaced recessed portions and operable by said motor, a time control circuit connecting said motor to a power supply, a cycle control switch connected in series with said time control circuit and having switch contact means engageable with the periphery of said disc and said recesses, said switch contact means of said cycle control switch opening the time control circuit upon engaging in said recesses of said control disc, time switch contact means, a temperature switch adapted to react to a predetermined temperature connected in series with said time switch contact means and connected in parallel with said cycle control switch for bridging same, a time control disc operable by said motor and adapted to actuate said time switch contact means, a relay switch controlling said heating resistances, said relay switch being connected in the time control motor circuit and being normally open and closing upon operation of said time switch contact means, said temperature switch closing the motor circuit when the desired temperature has been reached, said time-control disc having spaced peripheral recesses, said time switch contact means having contact arms provided with contact points adapted to engage said peripheral recesses for interrupting the circuit to said heating resistances, said switch contact means of said cycle control switch adapted to engage in the recessed portions of said time-control disc to interrupt said cycle control switch shortly before the peripheral recesses of said time switch contact means have been reached.

References Cited in the file of this patent
UNITED STATES PATENTS

| | | |
|---|---|---|
| 2,328,073 | Hanney | Aug. 31, 1943 |
| 2,693,097 | Chatelain | Nov. 2, 1954 |
| 2,781,765 | Steidley | Feb. 19, 1957 |

FOREIGN PATENTS

| | | |
|---|---|---|
| 859,597 | Germany | Dec. 15, 1952 |